United States Patent
Sabelli et al.

(10) Patent No.: US 11,153,644 B1
(45) Date of Patent: *Oct. 19, 2021

(54) METHODS, SYSTEMS, AND MEDIA FOR GENERATING A MEDIA QUALITY SCORE ASSOCIATED WITH THE PRESENTATION OF A CONTENT ITEM

(71) Applicant: Integral Ad Science, Inc., New York, NY (US)

(72) Inventors: Anthony Sabelli, Darien, CT (US); Amy Shriber, New York, NY (US); Sergei Izrailev, New York, NY (US); Mandeep Singh Badwal, New York, NY (US); Ana Calabrese, New York, NY (US); Mattia Fumagalli, Brooklyn, NY (US); Masroor Naved, Aldie, VA (US); Bradley O. Timmers, Glen Ridge, NJ (US); Kiril Tsemekhman, Long Island City, NY (US); Stefano Vegnaduzzo, Ann Arbor, MI (US)

(73) Assignee: Integral Ad Science, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/888,132

(22) Filed: May 29, 2020

Related U.S. Application Data (63) Continuation of application No. 15/981,427, filed on May 16, 2018, now Pat. No. 10,674,206.

(Continued)

(51) Int. Cl.
| | | |
|---|---|---|
| *H04N 21/442* | (2011.01) | |
| *H04N 21/81* | (2011.01) | |
| *G06Q 30/02* | (2012.01) | |

(52) U.S. Cl.
CPC ... *H04N 21/44204* (2013.01); *G06Q 30/0241* (2013.01); *G06Q 30/0242* (2013.01);
(Continued)

(58) Field of Classification Search
CPC .......... H04N 21/44204; H04N 21/812; H04N 21/8173; G06Q 30/0246; G06Q 30/0241; G06Q 30/0242
See application file for complete search history.

(56) References Cited

U.S. PATENT DOCUMENTS

| | | |
|---|---|---|
| 9,066,122 B1 | 6/2015 | Rattazzi et al. |
| 9,275,398 B1 | 3/2016 | Kumar et al. |

(Continued)

OTHER PUBLICATIONS

Notice of Allowance dated Jan. 21, 2020 in U.S. Appl. No. 15/981,427, pp. 2-4.

(Continued)

*Primary Examiner* — Nasser M Goodarzi
*Assistant Examiner* — Patrick A Ryan
(74) *Attorney, Agent, or Firm* — Byrne Poh LLP (57) ABSTRACT

Methods, systems, and media for generating a media quality score associated with the presentation of a content item are provided. In some embodiments, the method comprises: receiving a plurality of measurement streams associated with a presentation of a video content item comprising a plurality of frames; extracting, using the hardware processor, a plurality of measurements from the plurality of measurement streams; associating each measurement of the plurality of extracted measurements with a particular time position of the presentation of the video content item, wherein groups of measurements are associated with each time position of the presentation of the video content item; determining an interaction score between each measurement in a group of measurements at each particular time position of the plurality of measurement streams to obtain a plurality of interaction scores for the plurality of measurement streams at each time position; combining the plurality of interaction to generate a media quality score for the presentation of the video content item; determining whether the video content item was presented as intended by a content provider; and transmitting a notification that includes the media quality score and that includes an indication of the determination of whether the video content item was presented as intended by the content provider.

21 Claims, 5 Drawing Sheets

Related U.S. Application Data

(60) Provisional application No. 62/507,045, filed on May 16, 2017.

(52) U.S. Cl.
CPC ....... *H04N 21/812* (2013.01); *H04N 21/8173* (2013.01); *G06Q 30/0246* (2013.01)

(56) References Cited

U.S. PATENT DOCUMENTS

| | | |
|---|---|---|
| 2014/0172547 A1 | 6/2014 | Subramanian et al. |
| 2014/0195330 A1 | 7/2014 | Lee et al. |
| 2014/0344880 A1 | 11/2014 | Geller et al. |
| 2017/0228762 A1 | 8/2017 | Riviello et al. |
| 2017/0236148 A1 | 8/2017 | James et al. |
| 2018/0033054 A1 | 2/2018 | Champy et al. |
| 2018/0184169 A1 | 6/2018 | Maughan et al. |

OTHER PUBLICATIONS

Office Action dated Dec. 4, 2019 in U.S. Appl. No. 15/981,427, pp. 2-13.

METHODS, SYSTEMS, AND MEDIA FOR GENERATING A MEDIA QUALITY SCORE ASSOCIATED WITH THE PRESENTATION OF A CONTENT ITEM

CROSS-REFERENCE TO RELATED APPLICATIONS

This application is a continuation of U.S. patent application Ser. No. 15/981,427, filed May 16, 2018, which claims the benefit of U.S. Provisional Patent Application No. 62/507,045, filed May 16, 2017, each of which is hereby incorporated by reference herein in its entirety.

TECHNICAL FIELD

The disclosed subject matter relates to methods, systems, and media for generating a media quality score associated with the presentation of a content item.

BACKGROUND

Measurements for display ads generally evaluate independent qualities about a given impression. A quality metric for display ads is generally comprised of multiple individual numerical values related to different static properties related to a given impression. These properties generally can be measured independently, and either do not change over the course of an impression or can be evaluated using a single number per impression. Specifically, display ads have a given size (height×width), and are placed in a larger box somewhere on a page. A user frequently interacts with such a display ad by scrolling the display ad such that is in-view, partially-in-view, or out-of-view. In a more particular example, it is typical to characterize an ad impression by how long the display ad is in view and how much of the display ad is in view—e.g., whether X % of the ad was in view of Y seconds.

Moreover, the content surrounding the ad on the page may be important within the context of brand safety and ad/environment alignment. In addition, an advertiser or content provider typically wants to know if the impression was viewed by an actual human, or if it was fraudulent (e.g., bot traffic). Each of these queries and properties can generally be addressed with an individual numerical value.

These numerical value measurements, however, cannot be used to reflect the quality of a video ad impression. Nevertheless, many video ad impressions are measured by obtaining static viewing information over time and taking an average. This approach, however, ignores how elements of a video ad interact. Moreover, this approach does not measure whether the video ad was viewed as it was intended by the creator or provider of the video ad.

Accordingly, it is desirable to provide methods, systems, and media for generating a media quality score associated with the presentation of a content item.

SUMMARY

Methods, systems, and media for generating a media quality score associated with the presentation of a content item are provided.

In accordance with some embodiments of the disclosed subject matter, a method for evaluating multiple qualities of a presented content item is provided, the method comprising: receiving, using a hardware processor associated with a computing device, a plurality of measurement streams associated with a presentation of a video content item comprising a plurality of frames; extracting, using the hardware processor, a plurality of measurements from the plurality of measurement streams; associating, using the hardware processor, each measurement of the plurality of extracted measurements with a particular time position of the presentation of the video content item, wherein groups of measurements are associated with each time position of the presentation of the video content item; determining, using the hardware processor, an interaction score between each measurement in a group of measurements at each particular time position of the plurality of measurement streams to obtain a plurality of interaction scores for the plurality of measurement streams at each time position; combining, using the hardware processor, the plurality of interaction to generate a media quality score for the presentation of the video content item; determining, using the hardware processor, whether the video content item was presented as intended by a content provider; and transmitting, using the hardware processor, a notification that includes the media quality score and that includes an indication of the determination of whether the video content item was presented as intended by the content provider.

In some embodiments, the method further comprises: receiving a plurality of criteria for determining a media quality score; generating browser code that monitors a subset of measurement streams from the plurality of measurement streams associated with the video content item being presented using a web browsing application; transmitting the browser code to the web browsing application; and receiving the subset of measurement streams corresponding to the presentation of the video content item.

In some embodiments, the method further comprises: determining that a measurement stream of the plurality of measurement streams is relatively constant over the presentation of the video content item; and determining that the measurement stream should no longer be collected in response to determining that the measurement stream is relatively constant over the presentation of the video content item.

In some embodiments, the method further comprises modifying the browser code to receive a single measurement associated with the measurement stream, wherein the measurement stream is inhibited from being collected.

In some embodiments, the method further comprises reducing a sampling rate associated with the measurement stream.

In some embodiments, the method further comprises, in response to associating each measurement of the plurality of extracted measurements with the particular time position of the presentation of the video content item, determining that a measurement is not extracted from a measurement stream and is not associated with the particular time position.

In some embodiments, the method further comprises assigning a last known measurement as the measurement for the media quality score.

In some embodiments, the method further comprises determining the measurement from a time window of the video content item.

In some embodiments, the plurality of measurement streams includes a viewability measurement stream, wherein the viewability measurement stream includes a viewability score for each frame of the video content item based on a percentage of a frame of the video content item that is in view.

In some embodiments, the plurality of measurement streams includes a duration measurement stream, wherein the duration measurement stream includes a duration score of the presentation of the video content item compared with one or more intended durations.

In some embodiments, the plurality of measurement streams includes a screen diagonal measurement stream, wherein the screen diagonal measurement stream includes a screen diagonal score for each frame of the video content item that compares a window diagonal of a video window presenting the frame of the video content item with an available screen diagonal.

In some embodiments, the plurality of measurement streams includes an audio level measurement stream, wherein the audio level measurement stream includes an audio level score for each frame of the video content item that compares an audio level of an audio portion of the frame of the video content item with a maximum available audio level.

In some embodiments, the plurality of measurement streams includes a contextual classification measurement stream, wherein the contextual classification measurement stream includes a contextual classification score for each frame of the video content item.

In some embodiments, the plurality of measurement streams includes a brand safety measurement stream, wherein the brand safety measurement stream includes a brand safety measurement score for each frame of the video content item.

In some embodiments, the plurality of measurement streams includes a content adjacency stream, wherein the content adjacency stream includes a content adjacency score for each frame of the video content item based on other content items presented along with the frame of the video content item.

In some embodiments, the method further comprises: generating a plurality of media quality scores based on the presentation of video content items; receiving outcome information associated with each of the video content items; and associating each of the plurality of media quality scores with a predicted outcome.

In some embodiments, the outcome information includes at least one of a lift and a conversion.

In some embodiments, the method further comprises optimizing the predicted outcome associated with the video content item by optimizing the media quality score of the video content item.

In accordance with some embodiments of the disclosed subject matter, a system for evaluating multiple qualities of a presented content item is provided, the system comprising a memory and a hardware processor that, when executing computer executable instructions stored in the memory, is configured to: receive a plurality of measurement streams associated with a presentation of a video content item comprising a plurality of frames; extract a plurality of measurements from the plurality of measurement streams; associate each measurement of the plurality of extracted measurements with a particular time position of the presentation of the video content item, wherein groups of measurements are associated with each time position of the presentation of the video content item; determine an interaction score between each measurement in a group of measurements at each particular time position of the plurality of measurement streams to obtain a plurality of interaction scores for the plurality of measurement streams at each time position; combine the plurality of interaction to generate a media quality score for the presentation of the video content item; determine whether the video content item was presented as intended by a content provider; and transmit a notification that includes the media quality score and that includes an indication of the determination of whether the video content item was presented as intended by the content provider.

In accordance with some embodiments of the disclosed subject matter, a non-transitory computer-readable medium containing computer executable instructions that, when executed by a processor, cause the processor to perform a method for evaluating multiple qualities of a presented content item is provided, the method comprising: receiving a plurality of measurement streams associated with a presentation of a video content item comprising a plurality of frames; extracting, using the hardware processor, a plurality of measurements from the plurality of measurement streams; associating each measurement of the plurality of extracted measurements with a particular time position of the presentation of the video content item, wherein groups of measurements are associated with each time position of the presentation of the video content item; determining an interaction score between each measurement in a group of measurements at each particular time position of the plurality of measurement streams to obtain a plurality of interaction scores for the plurality of measurement streams at each time position; combining the plurality of interaction to generate a media quality score for the presentation of the video content item; determining whether the video content item was presented as intended by a content provider; and transmitting a notification that includes the media quality score and that includes an indication of the determination of whether the video content item was presented as intended by the content provider.

DETAILED DESCRIPTION

Mechanisms for generating a media quality score associated with the presentation of a content item are provided.

Generally speaking, the mechanisms described herein can determine whether a video content item, such as a video ad impression, was viewed as intended by the creator or provider of the video content item. Moreover, the mechanisms can generate a media quality score that combines multiple score components on a frame-by-frame basis and then aggregates the frame scores into the media quality score for the presented video content item.

In some embodiments, the mechanisms can include causing monitoring code to load in connection with a video content item on a page being presented by a web browsing application. It should be noted that the video content item can be presented in any suitable manner, such as using a web browsing application, using a mobile application, using a mobile web application, etc.

In some embodiments, the mechanisms can include receiving, from the monitoring code, a viewability measurement stream, wherein the viewability measurement stream includes a viewability score for each frame of the video content item based on a percentage of a frame of the video content item that is in view.

For example, the mechanisms can present a user interface for providing multiple criteria for determining a media quality score. In a more particular example, the multiple criteria can indicate that the media quality score is based on a viewability measurement stream, a screen size measurement stream, and an audio level measurement stream. In response to receiving the multiple criteria, browser code or any other suitable monitoring code can be generated, where the browser code is configured to, when transmitted to and loaded by a web browsing application, monitor the measurement streams corresponding to the multiple criteria associated with a video content item being presented using the web browsing application. In continuing this example, the browser code can be transmitted to the web browsing application and a subset of measurement streams corresponding to the presentation of the video content item can be received from the web browsing application.

In another suitable example, the browser code can be configured to collect and transmit multiple measurement streams, where measurements from a subset of the measurement streams that are selected based on the multiple criteria can be used.

In yet another suitable example, the browser code can be updated to collect a measurement stream that was not previously collected based on the multiple criteria. For example, in response to receiving a request to determine a media quality score based on audio level and in response to determining that audio level measurements have not been received, the browser code can be modified to collect audio level measurements associated with the presentation of a video content item using a web browsing application. Additionally or alternatively, the browser code can be modified to collect audio level measurement associated with the presentation of a video content item and comparing the audio level measurement with an intended audio level.

It should be noted that any suitable measurement stream can be received from the monitoring or browser code.

In some embodiments, the mechanisms can include receiving, from the monitoring code, a screen diagonal measurement stream, wherein the screen diagonal measurement stream includes a screen diagonal score for each frame of the video content item that compares a window diagonal of a video window presenting the frame of the video content item with an available screen diagonal.

In some embodiments, the mechanisms can include receiving, from the monitoring code, an audio level measurement stream during the presentation of the video content item, wherein the audio level measurement stream includes an audio level score for each frame of the video content item that compares an audio level of an audio portion of the frame of the video content item with a maximum available audio level.

It should be noted that the media quality score can include any suitable metric component. For example, other metric components can include brand safety metrics (e.g., content risk scores, environment layout scores, etc.), device type (e.g., physical device type, operating system type, browser type, etc.), device settings, ad skipability, fraud scores (e.g., how likely the view is being conducted by a bot or non-human entity), user-dependent scores (e.g., behavior metrics for user viewing impression), scrolling scores (e.g., a user scrolling during portions of the playback, reducing viewability score in response to determining that scrolling has occurred during the duration of the playback of the video ad), autoplaying scores (e.g., a score that reflects whether the video ad is set to autoplay, a score that reflects a default volume for the video ad, etc.), auto-refreshing scores, in-stream score (e.g., whether the video ad appears in stream with other content, a score that reflects the time fraction of the video ad relative to the total content), a creative-dependent metric (e.g., front loaded branding, a score proportional to human perception or attention, etc.), a player orientation score (e.g., landscape versus portrait), a load time score, a presence of objections obstructing or overlaying the video ad, clutter metrics (e.g., a score that reflects how many other advertisements or other pieces of content that are on the page), surrounding content metrics (e.g., a score that reflects the context of the ads, such as other videos on the page or other part of the page taking up resources; a score that reflects whether the video ad is integrated into the content of the page or ancillary to it; etc.), purchasing quality metrics (e.g., a score that reflects how the video ad was purchased), any suitable combination thereof, and/or any other suitable metric component.

In a more particular example, the measurement stream can include: a viewability measurement stream, where the viewability measurement stream includes a viewability score for each frame of the video content item based on a percentage of a frame of the video content item that is in view; a duration measurement stream, where the duration measurement stream includes a duration score of the presentation of the video content item compared with one or more intended durations; a screen diagonal measurement stream, where the screen diagonal measurement stream includes a screen diagonal score for each frame of the video content item that compares a window diagonal of a video window presenting the frame of the video content item with an available screen diagonal; an audio level measurement stream, where the audio level measurement stream includes an audio level score for each frame of the video content item that compares an audio level of an audio portion of the frame of the video content item with a maximum available audio level; a contextual classification measurement stream, where the contextual classification measurement stream includes a contextual classification score for each frame of the video content item; a brand safety measurement stream, where the brand safety measurement stream includes a brand safety measurement score for each frame of the video content item; and/or a content adjacency stream, where the content adjacency stream includes a content adjacency score for each frame of the video content item based on other content items presented along with the frame of the video content item.

It should be noted that measurement streams that correspond to, for example, brand safety, contextual classifications, and content adjacencies can be defined as dynamically changing over the presentation of the video content item.

In some embodiments, the mechanisms can extract measurements from the multiple measurement streams and associate each measurement with a particular time position of the presentation of the video content item, where groups of measurements are associated with each time position. For example, each frame of a video content item can be associated with multiple measurements that are extracted from the multiple measurements streams.

In some embodiments, the mechanisms can determine that a measurement stream provides measurements that are relatively constant over the presentation of the video content item. In response, the mechanisms can then determine that the measurement stream should no longer be collected by the monitoring or browser code. For example, the browser code can be modified to receive a single measurement associated with the measurement stream, where the measurement stream can be inhibited or otherwise prevent from being collected. Alternatively, the browser code can be modified to reduce a sampling rate associated with the measurement stream. This can, for example, reduce the amount of memory and network resources needed to obtain measurements associated with the presentation of a video content item.

In response, the mechanisms can determine an interaction score between each measurement in a group of measurements at each particular time position of the measurement streams to obtain multiple interaction scores for the plurality of measurement streams at each time position. In some embodiments, in the instance where there are three metric components of viewability, screen size, and audio level, the mechanisms can determine an interaction between the viewability measurement stream, the screen diagonal measurement stream, and the audio level measurement stream by combining the viewability score, the screen diagonal score, and the audio level score at each frame to generate a plurality of frame scores for the plurality of frames in the video content item.

In some embodiments, the mechanisms can determine that a measurement has not been extracted from a measurement stream for a particular time position of the presentation of the video content item. For example, the mechanisms can determine that multiple measurements have been extracted and associated with a particular time position with the exception of one measurement (e.g., an audio level measurement). In response, the mechanisms can assign a last known measurement to the missing measurement using a last observation carried forward approach. Alternatively, the mechanisms can determine the measurement from a time window of the video content item (e.g., an average of the measurements in the first minute of the video content item, an average of the measurement in the last ten seconds of the video content item, etc.).

In some embodiments, the mechanisms can combine the plurality of frame scores to generate an overall quality score for the presentation of the video content item.

In some embodiments, the mechanisms can transmit a notification of the overall quality score to an entity associated with the video content item.

It should be noted that video ads pose the challenge in that ad is evolving as a viewer watches or does not watch the ad.

For example, video ads can have a height and a width, but this is less static as player size is frequently variable. In another example, a user may interact with the ad similar to display ads by scrolling, or the ad may appear before other video content or mid-stream in other video content. In yet another example, a player is also frequently only a component of a page and when evaluating the context of a page, one not only needs to consider the content surrounding the player, but the other video content before and/or after the ad. Moreover, a video ad can have an intended duration, which may or may not be reached.

It should be noted that, in some embodiments, intended audio duration and intended video duration can be components of the media quality score. It should also be noted that, in some embodiments, intended audio duration of a video ad impression can be set as being generally equivalent to intended video duration of the video ad impression.

In each of these cases, the quality of the impression can vary as the video ad is being played back, and, moreover, individual, independently measured aspects of the playback can interact continuously in time rather than remaining static for the duration. For at least this reason, the mechanisms described herein can consider the time series of measurements in each category and combine them at each point in time to yield a quality function that varies with time. In another way, this quality function can be used to evaluate the quality of the video ad impression frame by frame. The quality function can then be aggregated to a single number.

In some embodiments, assuming that the media quality score incorporates at least three metrics, where each metric varies with time. As used herein, these three metric components of the media quality score can be denoted as A(t), B(t), and C(t). Each metric component can be normalized so that:

$A(T), B(t), C(t) \in [0,1]$.

Furthermore, the media quality score can be defined by the following quality function:

$Q(t) = A(t) \times B(t) \times C(t)$.

In order to aggregate Q(t), the media quality score can integrate with respect to time:

$$Q = \int_0^{T_f} Q(t)dt,$$

where $T_f$ can denote the final time for which Q(t) is defined. Should the metrics be aggregated in time first and then combined to yield one score, an alternative metric can be:

$$\tilde{Q} = \left(\int_0^{T_f} A(t)dt\right) \times \left(\int_0^{T_f} B(t)dt\right) \times \left(\int_0^{T_f} C(t)dt\right).$$

As such, it can be seen that $\tilde{Q} \neq Q$.

For at least this reason, the quality function can be created by first combining the metrics frame by frame and then using an aggregation function.

An illustrative example of such a media quality score is:

$$S = \frac{1}{T_D D_S A_M} \int_0^{T_f} P(t)D(t)A(t)dt,$$

where $T_D$ can denote the intended duration, $D_S$ can denote the screen diagonal, $A_M$ can denote the maximum audio level, P(t) is the percent in view at time t, D(t) is the diagonal of the ad at time t, and A(t) is the audio level at time t.

It should be noted that the media quality score, S, can be rewritten as:

$$S = \frac{1}{T_D} \int_0^{T_f} P(t) \frac{D(t)}{D_S} \frac{A(t)}{A_M} dt \text{ or,}$$

$$S = \frac{1}{T_D} \int_0^{T_f} P(t)\tilde{D}(t)\tilde{A}(t)dt \text{ where,}$$

$$\tilde{D}(t) = \frac{D(t)}{D_S}, \tilde{A}(t) = \frac{A(t)}{A_M}.$$

It should be noted that, as shown in the representation above, each component can range between 0 and 1. Accordingly, in order to yield a high media quality score, each component needs to be near 1, during the same time period. Moreover, this media quality score is an improvement over approaches that combines measurements first and marginalizes second (aggregating over a variable). For example, in instances where a video ad impression is audible and not in view for the first half, and in view but not audible for the second half. The above-mentioned approach can yield a score of zero for this video ad impression because for no portion of the video ad impression was the video ad experienced as it was intended (e.g., both seen and heard). The conventional approach, instead, would yield some score above zero, because it considers these components independently and not interactively.

In some embodiments, weights can be applied to particular metric components. As such, multiple frame-by-frame media quality scores can be generated using different schemes.

For example, should an audio metric not be as influential as a viewability metric (e.g., percent in view), the mechanisms can modify the audio metric with weights, such as:

$$\tilde{A}(t) = 0.5 + 0.5 \frac{A(t)}{A_M}.$$

In another example, should the metric components not be combined multiplicatively, the mechanisms can modify the frame-by-frame media quality score to be of the form:

$$Q(t)=P(t)+\tilde{D}(t)+\tilde{A}(t).$$

This quality function can, for example, create a combined time-based quality function first and then aggregate over time. It should be noted that the frame-by-frame metric can include any suitable number of components or take other function forms. Nevertheless, it should be noted that the quality function can determine media quality at any point during the impression and aggregated to obtain a single value over the entirety of the impression.

It should be noted that any suitable approach can be used to create a combined time-quality function.

Figure 1:
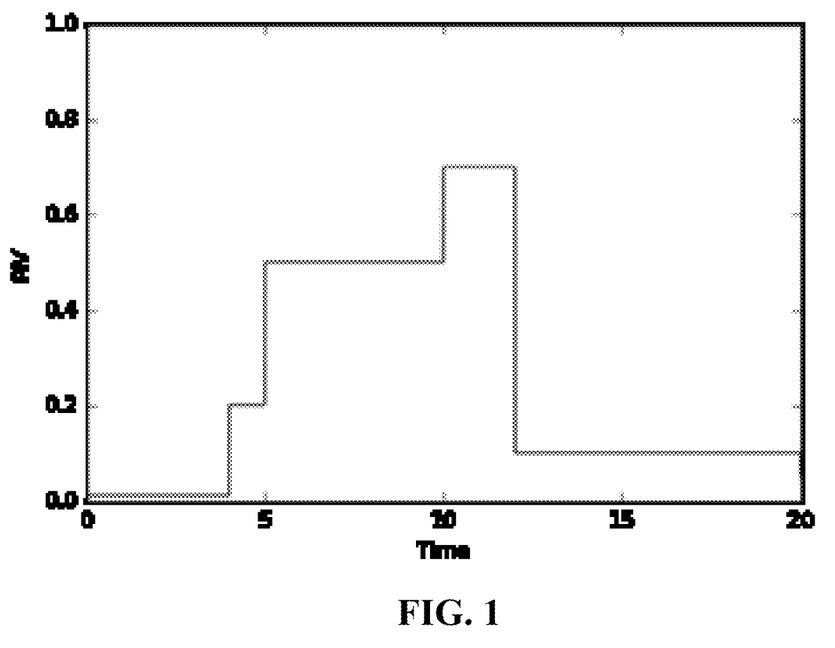
FIG. 1 shows an illustrative example in which each component of the media quality function is measured by a series of discreet events in accordance with some embodiments of the disclosed subject matter.

FIG. 1 shows an illustrative example in which each component of the media quality function is measured by a series of discreet events in accordance with some embodiments of the disclosed subject matter. It should be noted that the state of each measured quantity may not change between update events. As shown in FIG. 1, a measurement stream of a component of the media quality function is provided, where the jumps in the measurement stream correspond to a change in an update event.

Figure 2:
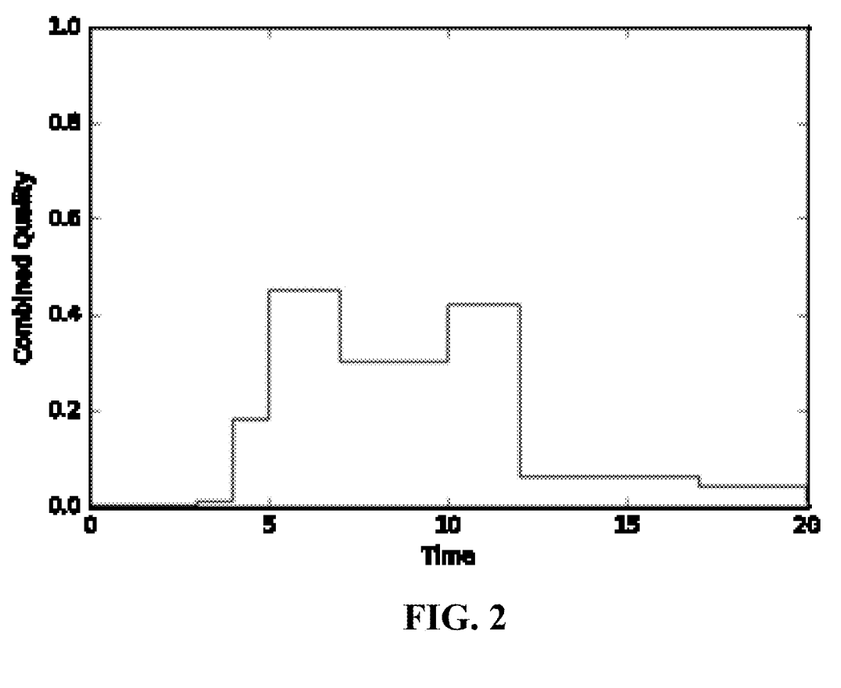
FIG. 2 shows an illustrative example in which combined measurement streams (e.g., multiplicatively) to generate a media quality score in accordance with some embodiments of the disclosed subject matter.

FIG. 2 shows an illustrative example in which combined measurement streams (e.g., multiplicatively) to generate a media quality score in accordance with some embodiments of the disclosed subject matter. It should be noted that, in order to obtain the media quality score as a single value, the combined measurement streams can integrate time (and, in some embodiments, normalized by intended duration or total time of the video ad impression). It should also be noted that this is generally equivalent to finding the (normalized) area under the quality curve. It should further be noted that normalization can remove the effect of varying intended durations. For example, a video ad that is viewable, audible, and presented in a full screen mode for 10 seconds can have a different quality if the video ad creative is supposed to run for an intended duration of 15 seconds (a 0.66 score) or for an intended duration of 30 seconds (a 0.33).

Figure 3:
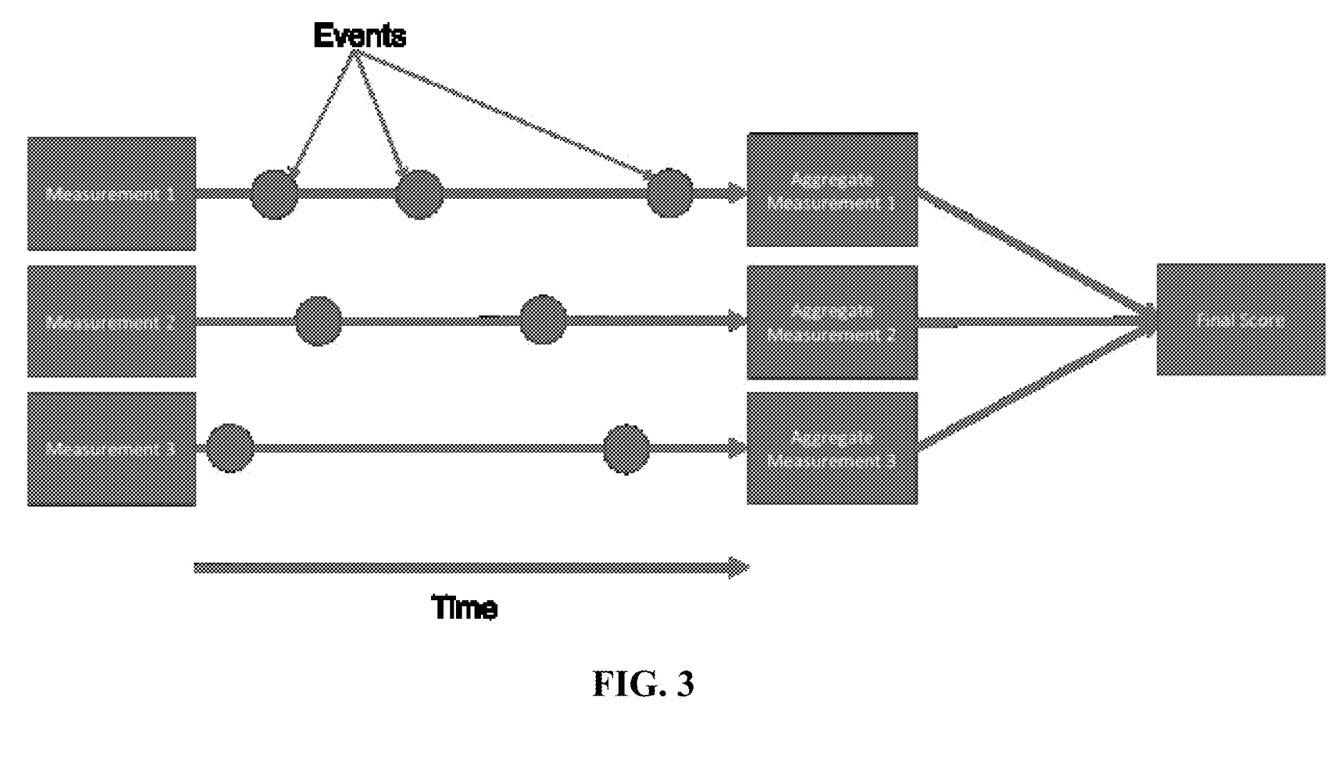
FIG. 3 shows an illustrative flow diagram for a scoring methodology in which each measurement stream is collected independently, averaged over time, and combined after removing the time component from each in accordance with some embodiments of the disclosed subject matter.

FIG. 3 shows an illustrative flow diagram for a scoring methodology in which each measurement stream is collected independently, averaged over time, and combined after removing the time component from each. As shown, this can, for example, ignore how elements of a video ad impression interacts and does not measure whether the video ad creative was viewed as it was intended by the creator or provider of the video ad.

Figure 4:
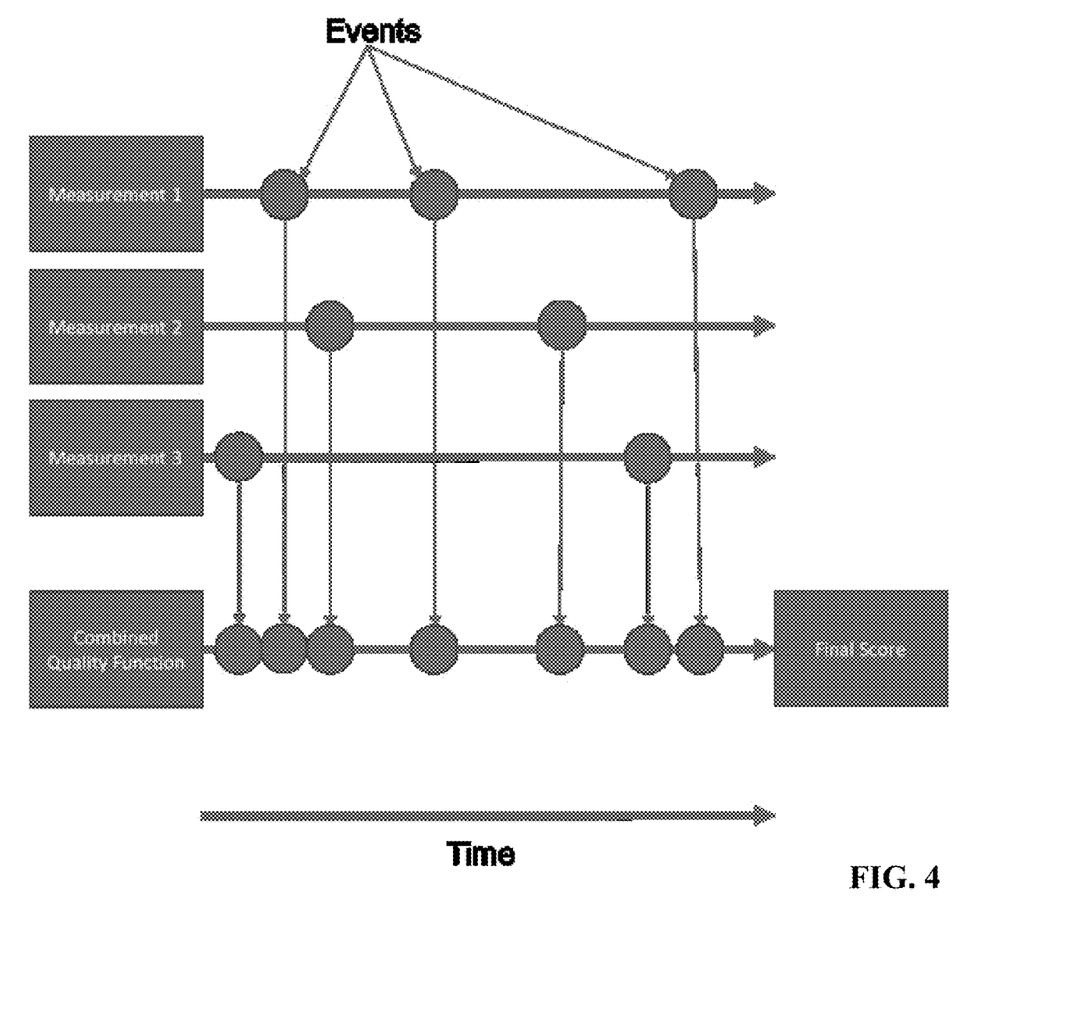
FIG. 4 shows an illustrative flow diagram for the media quality scoring mechanisms described herein in which a plurality of measurement streams that individually evaluate the state of a component of a video ad impression is received, the plurality of measurement streams are combined to generate a time-varying quality function at a frame-by-frame basis that varies during the duration of the video ad, and the frame scores from the time-varying quality function are aggregated to obtain a single media quality score in accordance with some embodiments of the disclosed subject matter.

In accordance with some embodiments of the disclosed subject matter, FIG. 4 shows an illustrative flow diagram for the media quality scoring mechanisms described herein in which a plurality of measurement streams that individually evaluate the state of a component of a video ad impression is received, the plurality of measurement streams are combined to generate a time-varying quality function at a frame-by-frame basis that varies during the duration of the video ad, and the frame scores from the time-varying quality function are aggregated to obtain a single media quality score.

These mechanisms can be used in any suitable application.

For example, in addition to obtaining a single media quality score for a video ad impression, the mechanisms can aggregate the media quality scores over different sets of impressions and transmit the aggregated score to a suitable entity. In a more particular example, the aggregated score can be an average score for a given host and day for a given ad campaign.

In another example, in addition to obtaining a single media quality score for a video ad impression, the mechanisms can be used in connection with determining optimal exposure frequency and/or optimal exposure time. These and other features for inhibiting the transmission of media content based on frequency and exposure measurements are further described in commonly owned, commonly assigned U.S. Provisional Patent Application No. 62/502,436, which was filed on May 5, 2017.

In yet another example, in addition to obtaining a single media quality score for a video ad impression, the mechanisms can be used to determine a bid price for ad inventory.

In a further example, in addition to obtaining a single media quality score for a video ad impression, the mechanisms can be used to determine desired ad placements based on media quality scores.

In another further example, multiple media quality scores based on the presentation of video content items can be generated. In continuing this example, outcome information associated with each of the video content items can be received, which can include lift information, conversion information, sales information, etc. Each of the plurality of media quality scores can be associated with a predicted outcome. This can, for example, allow a content provider to optimize for an outcome over the provision of a content item or campaign of content items by optimizing the media quality score for the given campaign. In addition, this can allow a content provider to target inventory having a higher predicted media quality score.

In a more particular example, the outcome information can correspond to relevant advertising outcomes. It should be noted that such outcome information can be measured digitally. It should also be noted that, in some embodiments, such outcome information can be measured concurrently with the presentation of the video content item (e.g., an ad impression). For example, a relevant advertising outcome can include information indicating that a viewer has selected an advertisement impression and directed to a homepage using a browsing application. In another example, a relevant advertising outcome can include information indicating that a viewer has visited a landing page related to a previously viewed content item (e.g., an ad impression). It should further be noted that, in some embodiments, outcome information can correspond to offline events, such as an in-store transaction or brand recall that is measured using a survey.

In some embodiments, the mechanisms can associate outcomes to users with groups of impressions or to individual ad impressions.

Figure 5:
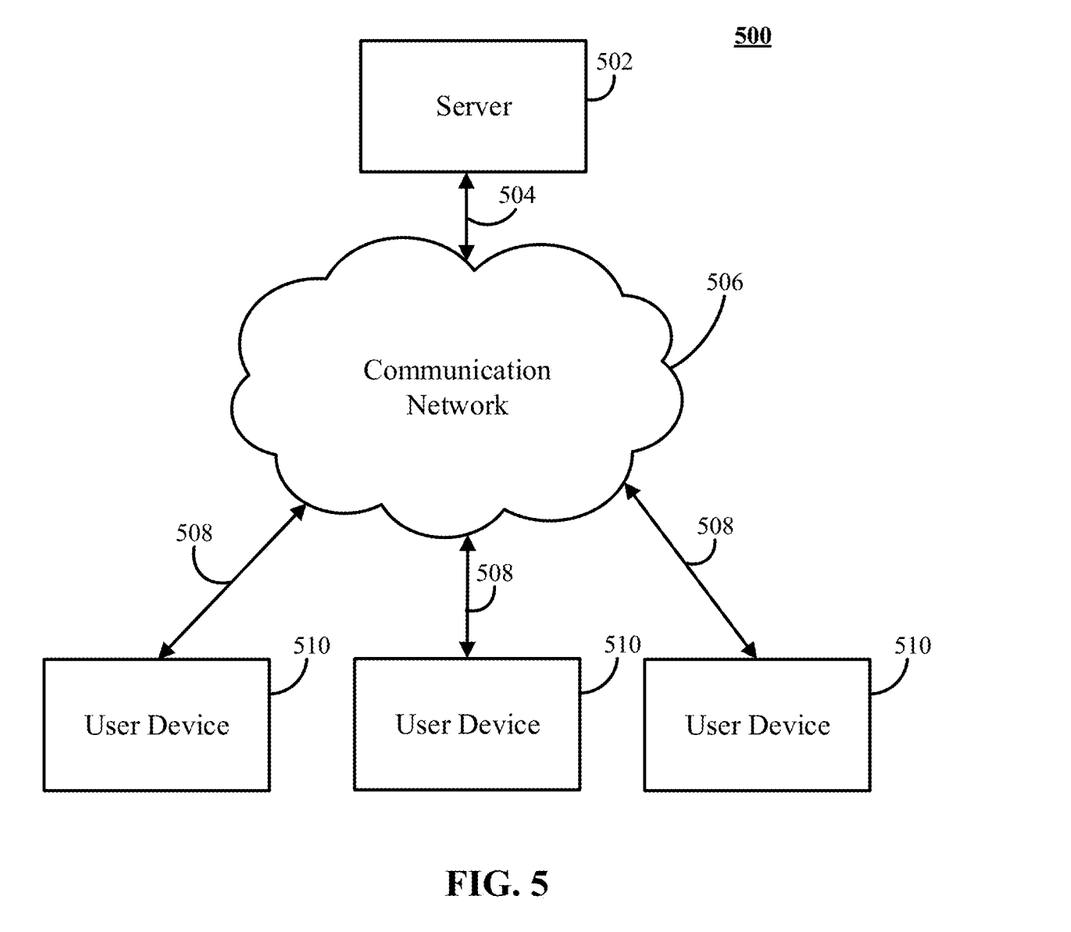
FIG. 5 shows a schematic diagram of an illustrative system suitable for implementation of the mechanisms described herein for determining a media quality score in accordance with some embodiments of the disclosed subject matter.

FIG. 5 shows an example 500 of a generalized schematic diagram of a system on which the mechanisms for determining a media quality score associated with the presentation of a video content item as described herein can be implemented in accordance with some embodiments of the disclosed subject matter. As illustrated, system 500 can include one or more user devices 510. User devices 510 can be local to each other or remote from each other. User devices 510 can be connected by one or more communications links 508 to a communication network 506 that can be linked to a server 502 via a communications link 504.

System 500 can include one or more servers 502. Server 502 can be any suitable server or servers for providing access to the mechanisms described herein for determining a media quality score associated with the presentation of a video content item, such as a processor, a computer, a data processing device, or any suitable combination of such devices. For example, the mechanisms for determining a media quality score associated with the presentation of a video content item can be distributed into multiple backend components and multiple frontend components and/or user interfaces. In a more particular example, backend components, such as mechanisms for extracting measurements from measurement streams, associating measurements with time positions, determining an interaction score between each measurement in groups of measurements, combining the interaction scores to generate a media quality score, determining whether the video content item was viewed as intended, transmitting notifications regarding the media quality score, etc., can be performed on one or more servers 502. In another more particular example, frontend components, such as presentation of a user interface for receiving criteria for obtaining measurement streams, etc., can be performed on one or more user devices 510.

In some embodiments, each of user devices 510, and server 502 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 510 can be implemented as a personal computer, a laptop computer, a smartphone, a tablet computer, a mobile telephone, a wearable computer, any other suitable computing device, or any suitable combination thereof.

Communications network 506 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 504 and 508 can be any communications links suitable for communicating data among user devices 510 and server 502, such as network links, dial-up links, wireless links, hard-wired links, any other suitable communications links, or any suitable combination of such links. Note that, in some embodiments, multiple servers 502 can be used to provide access to different mechanisms associated with the mechanisms described herein for determining a media quality score associated with the presentation of a video content item.

Figure 6:
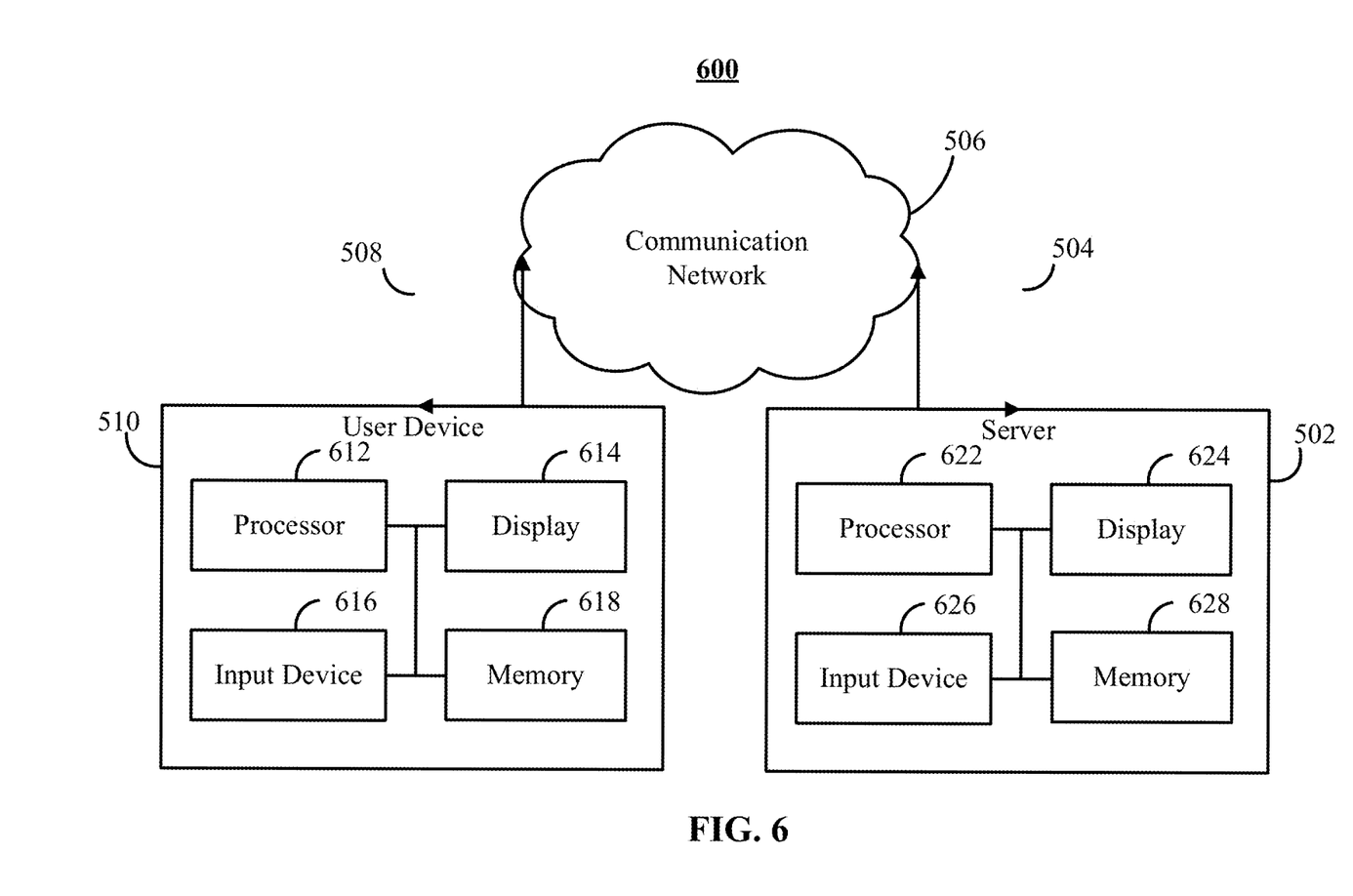
FIG. 6 shows a detailed example of hardware that can be used in a server and/or a user device of FIG. 5 in accordance with some embodiments of the disclosed subject matter.

FIG. 6 shows an example 600 of hardware that can be used to implement one or more of user devices 510, and servers 502 depicted in FIG. 5 in accordance with some embodiments of the disclosed subject matter. Referring to FIG. 6, user device 510 can include a hardware processor 612, a display 614, an input device 616, and memory 618, which can be interconnected. In some embodiments, memory 618 can include a storage device (such as a non-transitory computer-readable medium) for storing a computer program for controlling hardware processor 612.

Hardware processor 612 can use the computer program to execute the mechanisms described herein for determining a media quality score and/or for performing any other suitable task associated with the mechanisms described herein. For example, some of the above-mentioned features can be performed by hardware processor 612 (e.g., extracting measurements from the measurement streams, modifying the collection of measurements relating to the presentation of a video content item, etc.), while other features can be performed by a hardware processor executing on a server device (e.g., determining an interaction between the measurements at particular time positions, determining the media quality score, etc.). In some embodiments, hardware processor 612 can send and receive data through communications link 508 or any other communication links using, for example, a transmitter, a receiver, a transmitter/receiver, a transceiver, or any other suitable communication device. Display 614 can include a touchscreen, a flat panel display, a cathode ray tube display, a projector, a speaker or speakers, and/or any other suitable display and/or presentation devices. Input device 616 can be a computer keyboard, a computer mouse, a touchpad, a voice recognition circuit, a touchscreen, and/or any other suitable input device.

Server 502 can include a hardware processor 622, a display 624, an input device 626, and memory 628, which can be interconnected. In some embodiments, memory 628 can include a storage device (such as a non-transitory computer-readable medium) for storing data received through communications link 1404 or through other links. The storage device can further include a server program for controlling hardware processor 622. In some embodiments, memory 628 can include information stored as a result of user activity (e.g., user instructions to specify one or more advertising management techniques for particular advertising placements, etc.), and hardware processor 622 can receive information about advertising placements from user devices 510. In some embodiments, the server program can cause hardware processor 622 to, for example, receive a plurality of measurement streams associated with a presentation of a video content item comprising a plurality of frames, extract a plurality of measurements from the plurality of measurement streams, associate each measurement of the plurality of extracted measurements with a particular time position of the presentation of the video content item, wherein groups of measurements are associated with each time position of the presentation of the video content item, determine an interaction score between each measurement in a group of measurements at each particular time position of the plurality of measurement streams to obtain a plurality of interaction scores for the plurality of measurement streams at each time position, combine the plurality of interaction to generate a media quality score for the presentation of the video content item, determine whether the video content item was presented as intended by a content provider, transmit a notification that includes the media quality score and that includes an indication of the determination of whether the video content item was presented as intended by the content provider, and/or for perform any other suitable task associated with the mechanisms described herein.

Hardware processor 622 can use the server program to communicate with user devices 510 as well as provide access to and/or copies of the mechanisms described herein. It should also be noted that data received through communications link 504 or any other communications links can be received from any suitable source. In some embodiments, hardware processor 622 can send and receive data through communications link 504 or any other communications links using, for example, a transmitter, a receiver, a transmitter/receiver, a transceiver, or any other suitable communication device. In some embodiments, hardware processor 622 can receive commands and/or values transmitted by one or more user devices 510 and/or one or more users of server 502. Display 624 can include a touchscreen, a flat panel display, a cathode ray tube display, a projector, a speaker or speakers, and/or any other suitable display and/or presentation devices. Input device 66 can be a computer keyboard, a computer mouse, a touchpad, a voice recognition circuit, a touchscreen, and/or any other suitable input device.

In some embodiments, server 502 can be implemented in one server or can be distributed as any suitable number of servers. For example, multiple servers 502 can be implemented in various locations to increase reliability and/or increase the speed at which the server can communicate with user devices 510. Additionally or alternatively, as described above in connection with FIG. 6, multiple servers 502 can be implemented to perform different tasks associated with the mechanisms described herein.

It should be understood that the mechanisms described herein can, in some embodiments, include server-side software, server-side hardware, client-side software, client-side hardware, or any suitable combination thereof. For example, the mechanisms described herein can encompass a computer program written in a programming language recognizable by server 502 and/or by user device 510 (e.g., a program written in a programming language, such as, Java, C, Objective-C, C++, C #, JavaScript, Visual Basic, or any other suitable approaches). As another example, the mechanisms described herein can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

It should be noted that any suitable hardware and/or software can be used to perform the mechanisms described herein. For example, a general purpose device such as a computer or a special purpose device such as a client, a server, etc. can be used to execute software for performing the mechanisms described herein. Any of these general or special purpose devices can include any suitable components such as a hardware processor (which can be a microprocessor, digital signal processor, a controller, etc.), memory, communication interfaces, display controllers, input devices, etc. This hardware and/or software can be implemented as part of other equipment or can be implemented as stand-alone equipment (which can be coupled to other equipment).

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for generating a media quality score associated with the presentation of a content item are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for evaluating multiple qualities of a presented content item, the method comprising:
    associating, using a hardware processor, each measurement of a plurality of measurements from a plurality of measurement streams with a particular time position of the presentation of a content item, wherein groups of measurements are associated with each time position of the presentation of the content item;
    in response to associating each measurement of the plurality of measurements with the particular time position of the presentation of the content item, determining, using the hardware processor, that a measurement from the plurality of measurements is not associated with the particular time position;

assigning, using the hardware processor, a missing measurement to the measurement that was not associated with the particular time position;
determining, using the hardware processor, an interaction score between each measurement in a group of measurements at each particular time position of the plurality of measurement streams to obtain a plurality of interaction scores for the plurality of measurement streams at each time position; and
combining, using the hardware processor, the plurality of interaction scores to generate a media quality score for the presentation of the content item.

2. The method of claim 1, further comprising:
receiving the plurality of measurement streams associated with the presentation of the content item; and
extracting the plurality of measurements from the plurality of measurement streams.

3. The method of claim 1, further comprising:
determining whether the content item was presented as intended by a content provider; and
transmitting a notification that includes the media quality score and that includes an indication of the determination of whether the content item was presented as intended by the content provider.

4. The method of claim 1, further comprising:
receiving a plurality of criteria for determining the media quality score;
generating browser code that monitors a subset of measurement streams from the plurality of measurement streams associated with the content item being presented using a web browsing application;
transmitting the browser code to the web browsing application; and
receiving the subset of measurement streams corresponding to the presentation of the content item.

5. The method of claim 4, further comprising:
determining that a measurement stream of the plurality of measurement streams is relatively constant over the presentation of the content item; and
determining that the measurement stream should no longer be collected in response to determining that the measurement stream is relatively constant over the presentation of the content item.

6. The method of claim 5, further comprising modifying the browser code to receive a single measurement associated with the measurement stream, wherein the measurement stream is inhibited from being collected.

7. The method of claim 5, further comprising reducing a sampling rate associated with the measurement stream.

8. The method of claim 1, further comprising assigning a last known measurement as the measurement for the media quality score.

9. The method of claim 1, further comprising determining the measurement from a time window of the content item.

10. The method of claim 1, wherein the content item is a video content item, wherein the plurality of measurement streams includes a viewability measurement stream, and wherein the viewability measurement stream includes a viewability score for each frame of the video content item based on a percentage of a frame of the video content item that is in view.

11. The method of claim 1, wherein the plurality of measurement streams includes a duration measurement stream, wherein the duration measurement stream includes a duration score of the presentation of the content item compared with one or more intended durations.

12. The method of claim 1, wherein the content item is a video content item, wherein the plurality of measurement streams includes a screen diagonal measurement stream, and wherein the screen diagonal measurement stream includes a screen diagonal score for each frame of the video content item that compares a window diagonal of a video window presenting the frame of the video content item with an available screen diagonal.

13. The method of claim 1, wherein the plurality of measurement streams includes an audio level measurement stream, wherein the audio level measurement stream includes an audio level score for each frame of the content item that compares an audio level of an audio portion of the frame of the content item with a maximum available audio level.

14. The method of claim 1, wherein the plurality of measurement streams includes a contextual classification measurement stream, wherein the contextual classification measurement stream includes a contextual classification score for each frame of the content item.

15. The method of claim 1, wherein the plurality of measurement streams includes a brand safety measurement stream, wherein the brand safety measurement stream includes a brand safety measurement score for each frame of the content item.

16. The method of claim 1, wherein the plurality of measurement streams includes a content adjacency stream, wherein the content adjacency stream includes a content adjacency score for each frame of the content item based on other content items presented along with the frame of the content item.

17. The method of claim 1, further comprising:
generating a plurality of media quality scores based on the presentation of content items;
receiving outcome information associated with each of the content items; and
associating each of the plurality of media quality scores with a predicted outcome.

18. The method of claim 17, wherein the outcome information includes at least one of a lift and a conversion.

19. The method of claim 17, further comprising optimizing the predicted outcome associated with the content item by optimizing the media quality score of the content item.

20. A system for evaluating multiple qualities of a presented content item, the system comprising:
a hardware processor that, when executing computer executable instructions stored in the memory, is configured to:
associate each measurement of a plurality of measurements from a plurality of measurement streams with a particular time position of the presentation of a content item, wherein groups of measurements are associated with each time position of the presentation of the content item;
in response to associating each measurement of the plurality of measurements with the particular time position of the presentation of the content item, determine that a measurement from the plurality of measurements is not associated with the particular time position;
assign a missing measurement to the measurement that was not associated with the particular time position;
determine an interaction score between each measurement in a group of measurements at each particular time position of the plurality of measurement streams to obtain a plurality of interaction scores for the plurality of measurement streams at each time position; and combine the plurality of interaction scores to generate a media quality score for the presentation of the content item.

21. A non-transitory computer-readable medium containing computer executable instructions that, when executed by a processor, cause the processor to perform a method for evaluating multiple qualities of a presented content item, the method comprising:

associating each measurement of a plurality of measurements from a plurality of measurement streams with a particular time position of the presentation of a content item, wherein groups of measurements are associated with each time position of the presentation of the content item;

in response to associating each measurement of the plurality of measurements with the particular time position of the presentation of the content item, determining that a measurement from the plurality of measurements is not associated with the particular time position;

assigning a missing measurement to the measurement that was not associated with the particular time position;

determining an interaction score between each measurement in a group of measurements at each particular time position of the plurality of measurement streams to obtain a plurality of interaction scores for the plurality of measurement streams at each time position; and combining the plurality of interaction scores to generate a media quality score for the presentation of the content item.

* * * * *